United States Patent [19]

Motojima

[11] Patent Number: 4,496,664
[45] Date of Patent: Jan. 29, 1985

[54] OXINE IMPREGNATED ACTIVATED CHARCOAL METAL ION ADSORBENT

[75] Inventor: Kenji Motojima, Mito, Japan

[73] Assignee: Hitachi, Ltd., Tokyo, Japan

[21] Appl. No.: 361,415

[22] Filed: Mar. 24, 1982

[30] Foreign Application Priority Data

Mar. 31, 1981 [JP] Japan ................................. 56-46482

[51] Int. Cl.$^3$ ........................ B01J 20/26; B01J 20/20; G21F 9/12
[52] U.S. Cl. ............................... 502/402; 210/682; 210/688; 252/631; 502/401
[58] Field of Search ............... 252/428, 444, 626, 631; 210/682, 684, 688, 694; 55/72; 502/402, 401

[56] References Cited

U.S. PATENT DOCUMENTS 3,755,161  8/1973  Yokota et al. .......................... 55/72
4,222,892  9/1980  Motojima et al. ................... 252/428
4,266,045  5/1981  Vejima et al. ........................ 210/688
4,284,512  8/1981  Yodgkin ............................... 210/688

Primary Examiner—P. E. Konopka
Attorney, Agent, or Firm—Beall Law Offices

[57] ABSTRACT

A metal ion adsorbent free from release of oxine from activated charcoal even at a high temperature of more than 150° C. is prepared by adsorbing oxine or its derivative onto activated charcoal, adsorbing a phenol onto activated charcoal, dipping the resulting activated carbon into an aqueous solution of aldehyde such as formaldehyde, methylolizing oxine or its derivative in the presence of an acid or an alkali as a reaction promoter, and binding the methylolized oxine derivative, and the phenol by copolymerization or oxine can be methylolized in advance and then adsorbed onto the activated charcoal in place of adsorption of oxine onto the activated carbon, followed by methylolization of the oxine on the surface of the activated charcoal.

22 Claims, 5 Drawing Figures

OXINE IMPREGNATED ACTIVATED CHARCOAL METAL ION ADSORBENT

BACKGROUND OF THE INVENTION

This invention relates to a metal ion adsorbent and a process for preparing the same, and particularly to a metal ion adsorbent applicable to a purification system of nuclear reactor coolant, particularly suitable for purifying high temperature cooling water and a process for preparing the same.

A boiling water type nuclear reactor has a purification system for the nuclear reactor coolant for purifying cooling water in a nuclear reactor pressure vessel. The purification system of the nuclear reactor coolant has a filtration-demineralization apparatus comprising pre-coated powdery ion exchange resin, and further has both a regenerating heat exchanger and a non-regenerating heat exchanger. Coolant, after being cooled in individual heat exchangers, flows into the filtration-demineralization apparatus, which is backwashed with a frequency of about two weeks, generating a large amount of used powdery ion exchange resin as a radioactive waste. To reduce an amount of such radioactive waste and also to adsorb radioactive substances, it was proposed to use oxine impregnated activated charcoal. Above 150° C., oxine is gradually released from the oxine impregnated activated charcoal, and the releasing is accelerated at a higher temperature, deteriorating its adsorbability, and it is impossible to use it above 150° C. On the other hand, the cooling water in a nuclear reactor pressure vessel is at a temperature as high as about 280° C., and thus development of a powerful oxine impregnated activated charcoal having a high adsorbability even at a higher temperature has been keenly desired.

SUMMARY OF THE INVENTION

An object of the present invention is to provide a metal ion adsorbent capable of purifying a coolant at a higher temperature and a process for preparing the same.

Firstly, the present invention is characterized by a process for preparing a metal ion adsorbent, which comprises adsorbing oxine or its derivative onto an activated charcoal, and then binding the oxine or its derivative together on the surface of the activated charcoal by polymerization.

Secondly, the present invention is characterized by a process for preparing a metal ion adsorbent, which comprises adsorbing oxine or its derivative onto an activated charcoal, methylolizing the oxine or its derivative on the surface of the activated charcoal, and binding the methylolized oxine or derivative together by polymerization or by condensation.

Thirdly, the present invention is characterized by a process for preparing a metal ion adsorbent, which comprises adsorbing oxine or its derivative onto an activated charcoal or its derivative, dipping the resulting oxine or derivative-impregnated activated charcoal into an aqueous aldehyde solution, methylolizing the oxine or its derivative in the presence of an acid or an alkali as a reaction promoter, and binding the methylolized oxine or derivative together by polymerization.

Fourthly, the present invention is characterized by a process for preparing a metal ion adsorbent, which comprises adsorbing oxine or its derivative, and a phenol onto an activated charcoal, dipping the resulting oxine or derivative-impregnated activated charcoal into an aqueous aldehyde solution, methylolizing the oxine or its derivative in the presence of an acid or an alkali as a reaction promoter, and binding the methylolized oxine or derivative and the phenol together by copolymerization.

Fifthly, the present invention is characterized by a process for preparing a metal ion adsorbent, which comprises methylolized oxine or its derivative, adsorbing the resulting methylolized oxine or its derivative onto an activated charcoal, and binding the methylolized oxine or derivative together on the surface of the activated charcoal by polymerization.

Sixthly, the present invention is characterized by a process for preparing a metal ion adsorbent, which comprises methylolized oxine or its derivative, adsorbing the resulting methylolized oxine or derivative onto an activated charcoal, adsorbing a phenol onto the activated charcoal, and then binding the methylolized oxine or its derivative, and the phenol together on the surface of the activated charcoal by copolymerization.

Seventhly, the present invention is characterized by a metal ion adsorbent which comprises an activated charcoal and a polymerization product or a condensation product of oxine or its derivative covering the surface of the activated charcoal.

Eighthly, the present invention is characterized by a metal ion adsorbent, which comprises an activated charcoal and a copolymerization product of oxine or its derivative, and a phenol covering the surface of the activated charcoal.

DETAILED DESCRIPTION OF THE PREFERRED EMBODIMENT

Figure 1:
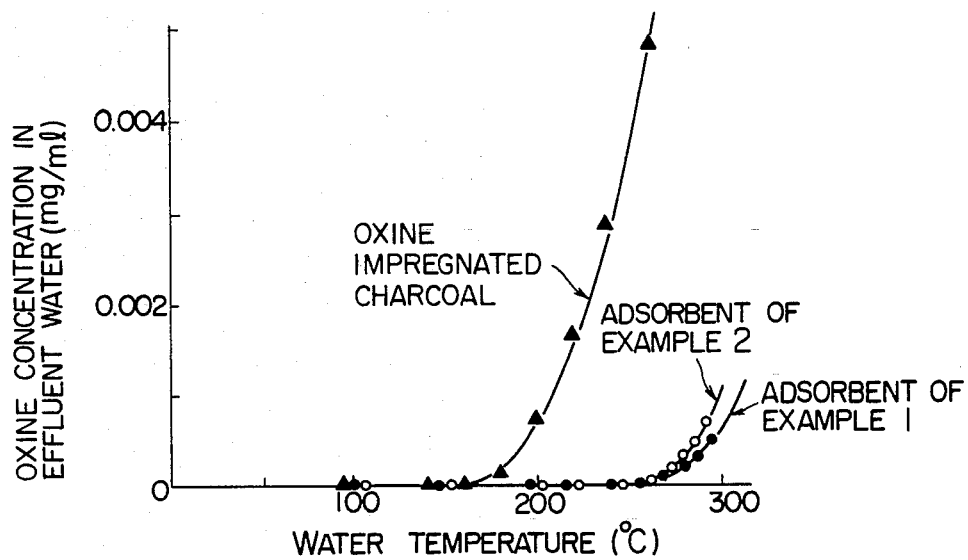
FIG. 1 is a diagram showing the stabilities of metal ion adsorbents at high temperature, which were measured by the amounts of oxide in the effluent water.

The present invention has been established, as a result of extensive study of the adsorbability of oxine impregnated activated charcoal in high temperature cooling water, which will be described below.

At a water temperature above 150° C., oxine is gradually released from the oxine impregnated activated charcoal when the oxine is merely adsorbed onto the activated charcoal, deteriorating the adsorbability, it is difficult to use the oxine impregnated activated charcoal at a temperature above 150° C., as described above.

If oxine could be converted to a more insoluble compound still having a functional group capable of forming chelates by applying some chemical means to the oxine adsorbed on the activated carbon, an ion adsorbent applicable to high temperature use would be available. On the basis of this thinking, the present inventor succeeded in synthesizing an adsorbent for heavy metal ions such as cobalt, etc., and which is stable up to about 300° C., by polymerizing oxine or its derivative or copolymerizing oxine or its derivative, and a phenol.

Oxine has the following structure:

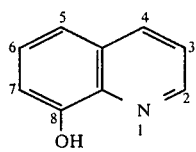
(1)

The functional group through which the oxine forms a chelate compound with many species of metal ions locates at the following part:

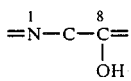
(2)

Many oxine derivatives having halogen atoms, alkyl groups, phenyl groups, sulfone groups, nitroso groups, nitro groups, amino groups, hydroxyl groups, etc. at positions 2–7 of formula (1) are available through synthesis.

Positions 5 and 7 of oxine [see formula (1)] correspond to para position and ortho position of phenol, respectively, and thus are chemically active and form methyloloxine by easy addition of formaldehyde as in the case of phenol. Polymers of oxine can be prepared by binding one another through methyl, ethyl or etheral bondage. If there is a phenol or a derivative in the reaction system, auxin can form copolymers therewith. By quite similar reaction to the synthesis of phenol resin can polymers of oxine or copolymers of oxine with resorcinol be formed. These materials can capture heavy metal ions by chelating, and are also stable in the air up to about 270° C. The said polymers, and copolymers are covered by the term "polymer" in a wide sense. However, the adsorbability of these polymers in a resinous state are greatly reduced, as compared with the chemical equivalent of the oxine used in the polymerization, and the polymers in a resinous state are disintegrated by repetition of swelling and shrinkage and cannot be used in high temperature water in a continued manner for a long time.

The present inventor has successfully prepared a heavy metal ion adsorbent having a high adsorbing efficiency for heavy metal ions, that is, metal ions of Cd, Co, Ni, Pb, Zn, etc. and which is very stable even in high temperature water, by synthesis, while dispersing the said chelating polymers into pores of chemically and mechanically stable activated charcoal. The present adsorbent can be applied directly to the clean up system of a nuclear reactor at a high temperature. Another advantage of the present adsorbent is that the present adsorbent having adsorbed radioactive nuclear species can be readily combusted to ashes at such a low temperature as 700° C. without scattering the radioactive nuclear species, thereby reducing the volume of the radioactive waste to a considerable degree. This is very important for radioactive waste disposal.

The outline of a process for preparing a metal ion adsorbent according to the present invention will be described below.

Up to about 35% by weight of oxine is deposited onto activated charcoal of any form, for example, granular form, disintegrated form or powdery form, on the basis of the activated charcoal, and then heated at 150°–200° C. to form polymers of oxine in the pores of activated charcoal. After the deposition of oxine, the resulting activated charcoal may be dipped into a solution of aldehyde, for example, an aqueous solution of formaldehyde or acetaldehyde to methylolize the oxine in the presence of an acid or an alkali as a reaction promoter, and then the resulting activated charcoal may be heated to form polymers of oxine. Or, oxine may be methylolized beforehand, and the methylolized oxine may be adsorbed onto activated charcoal, and then subjected to polymerization or condensation reaction. Furthermore, in the foregoing reaction, it is very effective to add an appropriate amount of a phenol, for example, phenol or resorcinol to oxine to form copolymers or condensates of the oxine and the phenol. Still furthermore, in these reactions, it is possible to use an oxine derivative such as 2-methyl oxine alone in place of the oxine or together with oxine. It is also possible to use an aldehyde source such as hexamethylenetetramine in place of the aldehyde, and very versatile procedures are available for this purpose as in the case of preparation of the phenol resin.

Processes for preparing a metal ion adsorbents will be described in detail below, referring to Examples.

EXAMPLE 1

200 g of activated charcoal prepared from coconut shells (disintegrated form of 24–42 mesh) was placed into an Erlenmeyer flask with ground stopper, and 40 g of purified powdery oxine was added thereto. The flask was shaken gently to adsorb the oxine onto the activated charcoal. About 10 minutes after the shaking, almost all of the oxine was adsorbed onto the activated charcoal, and the flask was then left standing for about 3 hours for aging. Then, 6.7 g of powdery resorcinol was added thereto, and the flask was shaken for about 30 minutes to adsorb the resorcinol onto the activated charcoal. Then, 25 ml of an aqueous 37% solution of formaldehyde was added thereto, and the flask was shaken to obtain a uniform mixture. Then, 15 ml of formic acid was added thereto, and gently mixed at 80° C. for about one hour. Aging was carried out at 80° C. for 3 hours with occasional shaking, and then heated at 150°–200° C. for about 3 hours to evaporate off the formic acid and unreacted formaldehyde and also to complete polymerization.

Test results of the characteristics of the adsorbent thus prepared will be shown below:

The ion adsorbent was placed in a stainless steel tube, 15 mm in inner diameter and 500 mm in length, and water was passed therethrough at a flow rate of 10 ml/min. while elevating the temperature of ion adsorbent at a rate of about 1° C./min. The water was preheated to the same temperature as that of ion adsorbent, and passed through the stainless steel tube. The effluent water from the stainless steel tube after the treatment was cooled to room temperature in a cooler and withdrawn. The functional groups of the compounds in the effluent water were quantitatively determined and calculated in terms of oxine, and are shown in FIG. 1 against the reaction temperature.

In FIG. 1, the characteristics of the adsorbent thus prepared according to the present invention are shown by mark "●" together with those of single oxine-impregnated activated charcoal, represented by mark "▲", which will be hereinafter referred to merely as "oxine impregnated activated charcoal" as a comparative example, and also together with those of adsorbent of following Example 2, represented by mark "o". As is evident from FIG. 1, the oxine is gradually released from the oxine impregnated activated charcoal above about 150° C., whereas the present adsorbent never undergoes substantial release of oxine until about 250° C.

Figure 2:
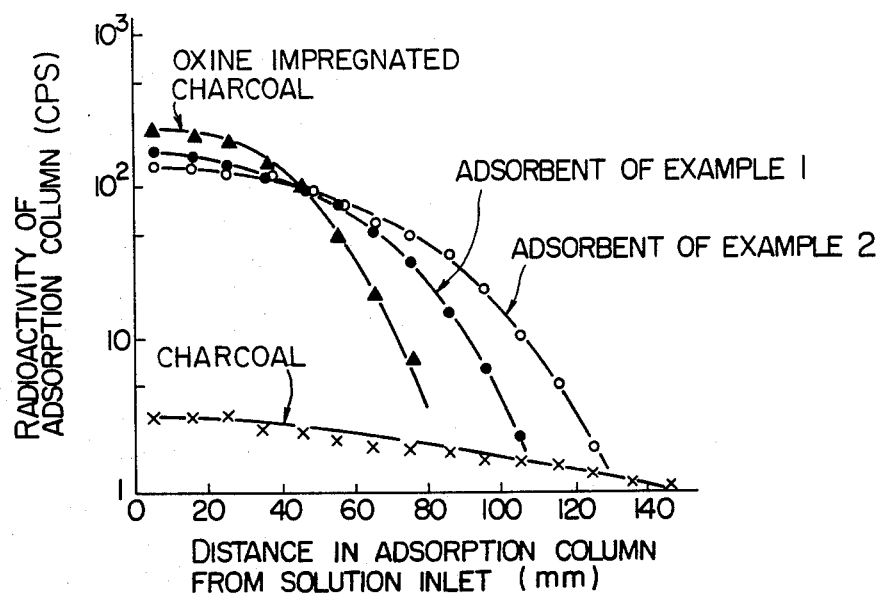
FIG. 2 is a diagram showing the distribution of cobalt ions adsorbed along the adsorbent column, which were measured using radioactive cobalt.

Separately, the adsorbent was placed in a glass tube, 12 mm in inner diameter and 150 mm in length, and 500 ml of an aqueous solution containing 150 ppm of cobalt ions labelled by cobalt 58 (pH 8.9, 80° C.) was passed through the glass tube at a flow rate of 4 ml/min., and then the adsorbent column in the glass tube was taken out in portions each equivalent to the column length of 1 cm to measure the radioactivity of the respective portions. The results are shown in FIG. 2, together with those of the comparative activated charcoal represented by mark "x", comparative oxine impregnated activated charcoal and the adsorbent of following Example 2. As is obvious from FIG. 2, adsorbents having a high cobalt-capturing ability have a high radioactivity near the flow inlet for the cobalt solution, and the radioactivity is gradually lowered towards the outlet. Adsorbent having a low capturing ability is rapidly saturated from the inlet towards the outlet with a small difference. It is also seen from FIG. 2 that even the activated charcoal has some cobalt-capturing ability, whereas the oxine impregnated activated charcoal has a drastically higher capturing ability. The present adsorbent has a little lower capturing ability than that of the oxine impregnated activated charcoal, but can be practically well used.

Figure 3:
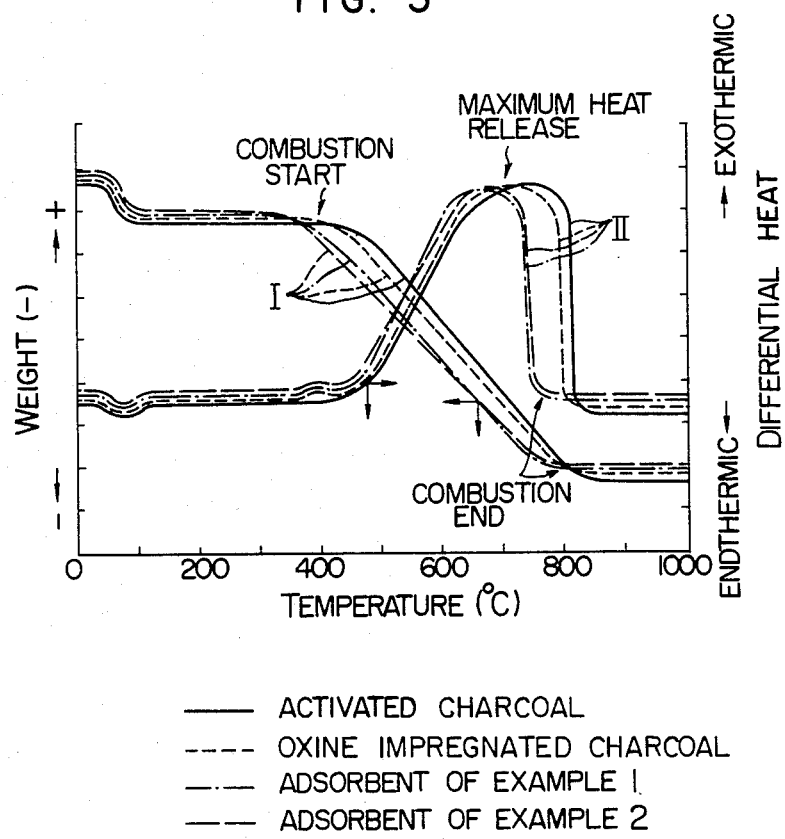
FIG. 3 is a diagram showing the thermo-analytical curves of activated charcoal, oxine impregnated charcoal and the synthetic adsorbents. Curves I are thermogravimetric and curves II are differential thermal ones respectively.

The present adsorbent was subjected to further tests by a thermo gravimetric and by differential thermal analysis, and the results are shown by alternate long and short dash line in FIG. 3, together with those of comparative activated charcoal by full line, oxine impregnated activated charcoal by dotted line, and the adsorbent of following Example 2 by broken line. I represents thermo gravimetric, and II differential thermal analysis.

As is evident from FIG. 3, the oxine impregnated activated charcoal has lower temperatures for combustion start and combustion end than the activated carbon, and the present adsorbent can be more readily combusted. The present adsorbent can attain considerable volume reduction by combustion.

The present adsorbent was further subjected to irradiation of γ-rays of $10^8$ roentgen, and then its cobalt-capturing ability was measured. It was found that the change in the ability after the irradiation was within the experimental error, and thus there was no substantial deterioration in the ability.

EXAMPLE 2

200 g of activated charcoal prepared from coconut shells (disintegrated form of 24–42 mesh) was placed into an Erlenmeyer flask with ground stopper, and 20 g of purified powdery oxine was added thereto. The flask was gently shaken for about 10 minutes, and then left standing for about 3 hours. Then, 15 ml of an aqueous 37% formaldehyde solution was added thereto and shaken to obtain a uniform mixture. Then, 210 ml of an aqueous 30% sodium hydroxide solution was added thereto, and gently mixed at 80° C. for about 2 hours. Then, aging was carried out at 80° C. for 4 hours with occasional shaking, and then the mixture was washed with about 500 ml of warm water, and then heated at 150°–200° C. for about 3 hours to complete polymerization. Then, the mixture was washed with warm water at about 80° C. until the pH of washing water was made less than 9.

Characteristics of the present adsorbent were measured under the same conditions as in Example 1, and the results are shown likewise in FIG. 1-FIG. 3.

As is obvious from FIG. 1, the present adsorbent undergoes no substantial release of oxine until about 240° C., and is as satisfactory as that of Example 1.

It is also seen from FIG. 2 that the present adsorbent has a little lower cobalt capturing ability than that of Example 1, but the amount of oxine for the present adsorbent is a half of that for the adsorbent of Example 1, and thus the cobalt-capturing ability can be regarded as rather improved. The present adsorbent can be practically well used.

As is evident from FIG. 3, the present adsorbent is substantially equal in the thermal properties to the adsorbent of Example 1, and can be readily combusted.

The present adsorbent was further subjected to irradiation of γ-rays of $10^8$ roentgen, and then its cobalt-capturing ability was measured. No substantial deterioration was found in the ability after the irradiation, as compared with that before the irradiation.

Figure 4:
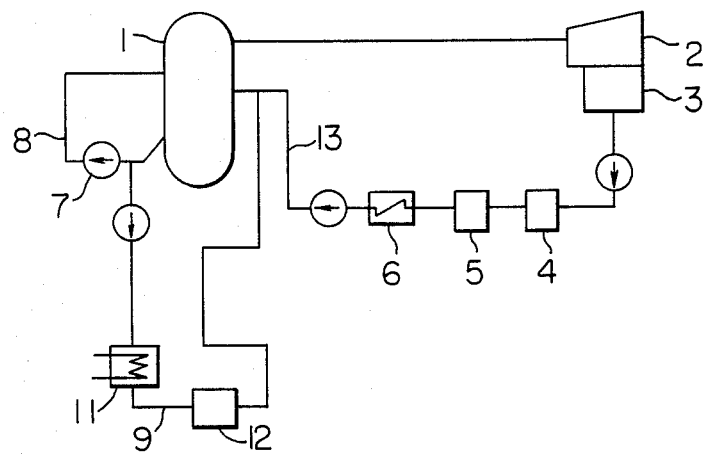
FIG. 4 is a flow diagram showing a purification system of a boiling water type nuclear reactor using a metal ion adsorbent according to the present invention.

A boiling water type nuclear reactor using the present metal ion adsorbent will be described below, referring to FIG. 4. In a boiling water type nuclear reactor, steam generated in nuclear reactor pressure vessel 1 is fed to turbine 2 and then condensed in condenser 3. The cooling water obtained by the condensation is returned to nuclear reactor pressure vessel 1 through first purifier 4, second purifier 5 and feed water heater 6. On the other hand, the cooling water (about 280° C.) in nuclear reactor pressure vessel 1 is led to the core in nuclear reactor pressure vessel 1 through recycle piping 8 by driving recycle pump 7. The cooling water passing through recycle piping 8 flows into nuclear reactor purification piping 9, cooled to about 250° C. through non-regenerating heat exchanger 11, and led to purifier 12. The cooling water leaving purifier 12 is returned to nuclear reactor pressure vesel 1 through feedwater piping 13. Second purifier 5 is a vessel filled with a mixture of granular cation exchange resin and anion exchange resin.

Figure 5:
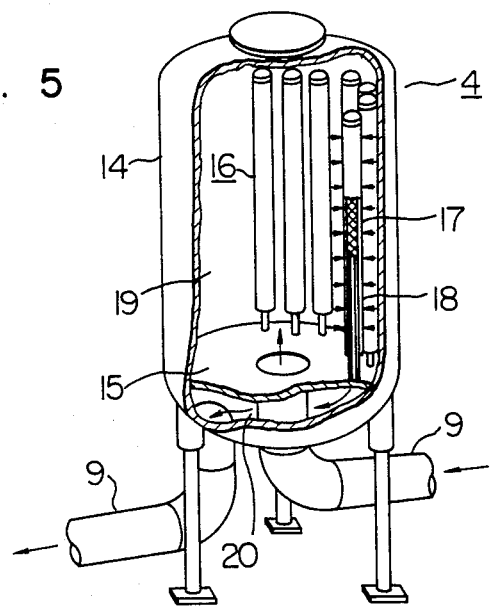
FIG. 5 is a cross-sectional view showing one embodiment of a purifier using a metal ion adsorbent according to the present invention.

The structure of purifier 12 will be described in detail below, referring to FIG. 5. Purifier 12 is provided with a plurality of adsorbers 16 fixed to support plate 15 in vessel 14. The adsorber 16 has an adsorption layer comprising a stainless steel cylindrical wiremesh 17 and powdery oxine impregnated activated charcoal prepared from disintegrated adsorbent of Example 2, and precoated onto the surface of the cylindrical wiremesh. The adsorption layer 18 is about 10 mm thick.

The structure of the first purifier 4 is the same as that of the purifier 12.

Cooling water at about 250° C., which flows into space 19 of vessel 14 through the piping 9, passes through the adsorption layer 18 from the surface of adsorption layer 18 into the cylindrical wiremesh 17, and flows down within the cylindrical wire mesh into space 20. Then, it is discharged into the piping 9 at the downstream side. The cobalt ions in the cooling water are adsorbed onto the surface of powdery oxine impregnated activated charcoal during the passage through the adsorption layer 18.

Thus, in the purification system of nuclear reactor coolant in a boiling water type nuclear reactor, it is not necessary to provide a regenerating heat exchanger in contrast to the conventional system, and consequently the structure of purification system of nuclear reactor coolant can be considerably simplified. Furthermore, a cooling capacity of heat exchanger in the purification system of nuclear reactor coolant can be reduced, and thus the heat efficiency of a nuclear power plant can be elevated.

According to the present invention, a high temperature coolant can be efficiently purified.

What is claimed is:

1. A process for preparing a metal ion adsorbent stable at temperatures up to about 300° comprising:
providing activated charcoal;
providing up to about 35 percent by weight based on the weight of the charcoal of an oxine having the following structure:

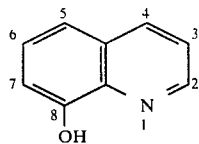

or its derivative substituted at positions 2–7 of the structure;
adsorbing the oxine or its derivative onto the activated charcoal; and
heating the oxine or oxine derivative adsorbed activated charcoal at a temperature of 150° to 200° C., thereby binding the oxine or its derivative to pores of the activated charcoal through polymerization or condensation.

2. A process according to claim 1, wherein the heating is conducted for about three hours.

3. A process for preparing a metal ion adsorbent comprising:
(a) adsorbing an oxine having the following structure:

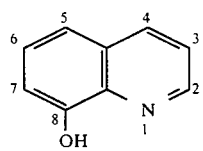

or its derivative substituted at positions 2–7 of the structure; onto activated charcoal;
(b) dipping the material resulting from (a) into an aqueous aldehyde solution or or an aqueous solution of hexamethylenetetramine;
(c) synthesizing methyloloxine from the material resulting from (b) on the activated charcoal in the presence of acid or alkali as a reaction promoter; and
(d) heating the material resulting from (c) to bind it together and to the pores of the activated charcoal through polymerization or condensation.

4. A process according to claim 3, wherein the heating is conducted for about three hours at 150° C.

5. A process according to claim 3, wherein the aldehyde selected from the group consisting formaldehyde or acetaldehyde.

6. A process according to claim 3, wherein a phenol is also adsorbed in step (b).

7. A process according to claim 6, wherein the heating is conducted for about three hours at 150° to 200° C.

8. A process according to claim 6, wherein the aldehyde selected from the group consisting of formaldehyde or acetaldehyde.

9. A process according to claim 6, wherein the phenol is selected from the group consisting of phenol and resorcinol.

10. A process for preparing a metal ion adsorbent comprising:
(a) adding an aqueous aldehyde solution or an aqueous solution of hexamethylenetetramine to an oxine having the following structure:

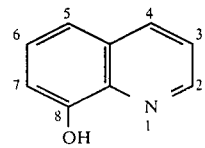

or its derivative substituted at positions 2–7 of the structure;
(b) synthesizing methyloloxine from the material resulting from (a) in the presence of acid or alkali as a reaction promoter;
(c) adsorbing the material resulting from (b) onto activated charcoal; and
(d) heating the material resulting from (c) to bind it together on the surface of said activated charcoal by polymerization or condensation.

11. A process according to claim 10, wherein the heating is conducted for about three hours at 150° C.

12. A process according to claim 10, wherein a phenol is also adsorbed in step (b).

13. A process according to claim 12, wherein the heating is conducted for about three hours at 150° C.

14. A process according to claim 12, wherein the aldehyde selected from the group consisting formaldehyde or acetaldehyde.

15. A process according to claim 12, wherein the phenol is selected from the group consisting of phenol and resorcinol.

16. A metal ion adsorbent stable at temperatures up to about 300° C. comprising activated charcoal and an oxine having the following structure:

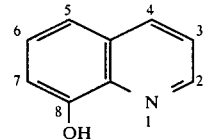

or its derivative substituted at positions 2–7 of the structure; polymerized or condensed in pores and on the surface of the activated charcoal by heating at 150° to 200° C.

17. A metal ion adsorbent stable at temperatures up to about 300° C. comprising activated charcoal and an oxine having the following structure:

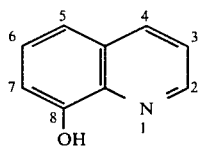

or its derivative substituted at positions 2-7 of the structure; and a phenol polymerized in pores and on the surface of the activated charcoal by heating at 150° to 200° C.

18. An adsorbent according to claim 17, wherein the phenol is selected from the group consisting of phenol and resorcinol.

19. A process for preparing a metal ion adsorbent, which comprises adsorbing oxine onto activated charcoal, aging the oxine adsorbed activated charcoal, adsorbing resorcinol powder onto the oxine adsorbed activated charcoal, adding an aqueous formaldehyde solution and then formic acid to the activated charcoal, followed by mixing and aging, and heating the activated charcoal at 150° to 200° C., thereby copolymerizing the oxine with resorcinol in pores on the surface of the activated charcoal.

20. The process according to claim 19, wherein 40 grams of oxine are adsorbed on 200 grams of activated charcoal and the mixture ages for about three hours; wherein 6.7 grams of resorcinol are adsorbed are adsorbed on the charcoal and further wherein 25 ml of 30 percent formaldehyde solution and 15 ml of formic acid are added and the mixture is aged for about three hours at 80° C. before heating.

21. A process for preparing a metal ion adsorbent, which comprises adding oxine to activated charcoal, shaking and then leaving the mixture for a few hours, adding an aqueous formaldehyde solution thereto, shaking the mixture, thereby making the mixture uniform, adding a sodium hydroxide solution thereto, followed by mixing and aging, washing the mixture with warm water, and heating the mixture at 150° to 200° C., thereby polymerizing the oxine in pores on the surface of the activated charcoal.

22. The process according claim 21, wherein 20 grams of oxine are adsorbed and 200 grams of activated charcoal and the mixture ages for about three hours; wherein 15 ml of 37 percent aqueous formaldehyde solution are added; wherein 210 ml of 30 percent sodium hydroxide are added and the mixture mixed for about two hours at 80° C. and aged for about four hours at 80° C.; and further wherein the resulting mixture is washed with 500 ml of water before heating at 150° to 200° C.

* * * * *